United States Patent
Alam et al.

(10) Patent No.: US 9,494,944 B2
(45) Date of Patent: Nov. 15, 2016

(54) DEVICE AND METHOD FOR CHOOSING LEADER VEHICLE OF A VEHICLE PLATOON

(71) Applicant: SCANIA CV AB, Södertälje (SE)

(72) Inventors: Assad Alam, Enskededalen (SE); Marek Sokalla, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/771,840

(22) PCT Filed: Feb. 27, 2014

(86) PCT No.: PCT/SE2014/050243
§ 371 (c)(1),
(2) Date: Sep. 1, 2015

(87) PCT Pub. No.: WO2014/137271
PCT Pub. Date: Sep. 12, 2014

(65) Prior Publication Data
US 2016/0026187 A1 Jan. 28, 2016

(30) Foreign Application Priority Data
Mar. 6, 2013 (SE) .................................. 1350268

(51) Int. Cl.
*G05D 1/02* (2006.01)
*B60W 30/16* (2012.01)
(Continued)

(52) U.S. Cl.
CPC ............ *G05D 1/0295* (2013.01); *B60W 30/16* (2013.01); *G05D 1/0088* (2013.01); *G08G 1/16* (2013.01); *G08G 1/22* (2013.01); *B60W 2750/308* (2013.01); *G05D 2201/0213* (2013.01)

(58) Field of Classification Search
CPC combination set(s) only.
See application file for complete search history.

(56) References Cited

U.S. PATENT DOCUMENTS 5,781,119 A   7/1998   Yamashita et al.
6,032,097 A   2/2000   Iihoshi et al.
(Continued)

FOREIGN PATENT DOCUMENTS

| DE | 103 48 635 A1 | 5/2005 |
|---|---|---|
| WO | WO 2004/077378 | 9/2004 |
| WO | WO 2012/014041 | 2/2012 |

OTHER PUBLICATIONS

International Search Report dated Jun. 30, 2014 issued in corresponding International patent application No. PCT/SE2014/050243.
(Continued)

*Primary Examiner* — Thomas Tarcza
*Assistant Examiner* — Edward J Pipala
(74) *Attorney, Agent, or Firm* — Ostrolenk Faber LLP

(57) ABSTRACT

A method in a vehicle platoon including at least one leader vehicle and at least one additional vehicle, where the leader vehicle is intended to detect ambient conditions. The method includes the steps of: appointing (s410) the leader vehicle which is responsible for communicating information to the at least one additional vehicle; and under certain conditions, appointing (s450) a new leader vehicle which assumes the responsibility. A computer program product has program code (P) for a computer (200; 210) to implement a method according to the invention. The invention also pertains to a device in vehicle platoons and a motor vehicle equipped with such a device.

11 Claims, 4 Drawing Sheets

Figure 1:
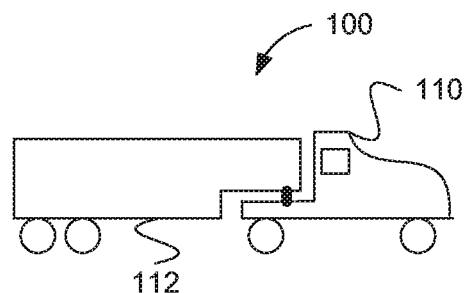

(51) Int. Cl.
   *G08G 1/16*   (2006.01)
   *G08G 1/00*   (2006.01)
   *G05D 1/00*   (2006.01)

(56) References Cited

U.S. PATENT DOCUMENTS

| | | |
|---|---|---|
| 6,313,758 B1 | 11/2001 | Kobayashi |
| 6,356,820 B1 | 3/2002 | Hashimoto et al. |
| 6,437,688 B1 | 8/2002 | Kobayashi |
| 2003/0182183 A1 | 9/2003 | Pribe |
| 2010/0256835 A1 | 10/2010 | Mudalige |
| 2010/0256852 A1* | 10/2010 | Mudalige ................ G08G 1/22 701/24 |
| 2014/0005906 A1* | 1/2014 | Pandita ................ B60W 30/17 701/96 |
| 2014/0244144 A1* | 8/2014 | You ................ G08G 1/22 701/117 |

OTHER PUBLICATIONS

International Preliminary Report on Patentability dated May 20, 2015 issued in corresponding International patent application No. PCT/SE2014/050243.

* cited by examiner

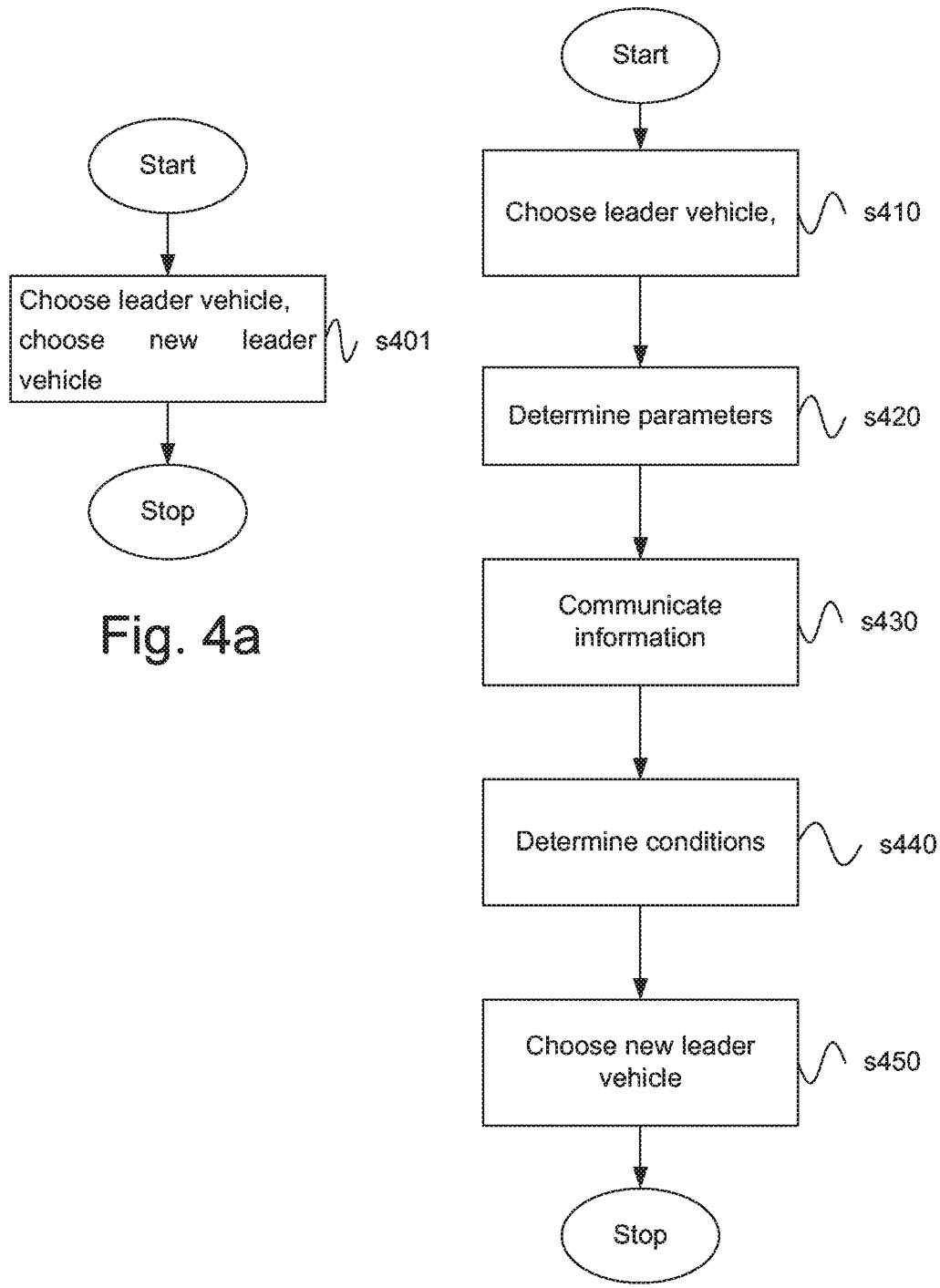

US 9,494,944 B2

DEVICE AND METHOD FOR CHOOSING LEADER VEHICLE OF A VEHICLE PLATOON

CROSS-REFERENCE TO RELATED APPLICATIONS

The present application is a 35 U.S.C. §§371 National Phase conversion of PCT/SE2014/050243, filed Feb. 27, 2014, which claims priority of Swedish Patent Application No. 1350268-7, filed Mar. 6, 2013, the contents of which are incorporated by reference herein. The PCT International Application was published in the English language.

TECHNICAL FIELD OF THE INVENTION

The present invention pertains to a method for leading a vehicle platoons which comprises at least one leader vehicle. The invention also relates to a computer program product, comprising program code for a computer, to implement a method according to the invention. The invention also pertains to a device in vehicle platoons, comprising at least one leader vehicle and a motor vehicle equipped with such device.

BACKGROUND

In vehicles today the air resistance when travelling is a factor which impacts fuel consumption, in particular for trucks or other relatively large vehicles which have a large front area.

The air resistance of a subsequent vehicle depends to a great extent on the distance to the vehicle in front. In principle, the smaller is the distance to a vehicle in front, the less is the air resistance, and thus the fuel consumption of the subsequent vehicle may be reduced. In cases where two or more vehicles are included in a so-called vehicle platoon, i.e. where the subsequent vehicle is driven relatively close to the vehicle in front, the fuel consumption of these vehicles may be reduced by e.g. 5-15%. Driving vehicles in vehicle platoons may thus reduce fuel costs considerably.

One disadvantage with driving a vehicle closely behind a vehicle in front is that visibility may be obscured. In the event a vehicle is driven relatively close to a truck with a covered trailer in front, visibility may be reduced considerably. This may cause inconvenience to a driver in the vehicle behind. Further, the driver of the vehicle behind may have a limited understanding of why automatic manoeuvres of the vehicle in front of the vehicle behind are carried out. This may involve automatic braking or automatic gear selection in a transmission of the vehicle behind. The limited visibility may result in an increased risk of accidents, since the perception of the driver of the vehicle behind is thus reduced.

It is important in connection with the driving of vehicle platoons that communication between vehicles forming part of the platoon functions well, and that an effective exchange of information is maintained. This is particularly important where vehicles leave the vehicle platoon while driving, or where vehicles join the vehicle platoon while driving.

US 2003182183 describes different aspects of vehicle platoons, e.g. how vehicles may establish communication among each other.

WO2004077378 describes a method for data communication between vehicles.

SUMMARY OF THE INVENTION

One objective of the present invention is to provide a novel and advantageous method of information sharing for vehicle platoons comprising at least one leader vehicle.

Another objective of the invention is to provide a novel and advantageous device, and a novel and advantageous computer program, for vehicle platoons comprising at least one leader vehicle.

Another objective of the invention is to provide a method, a device and a computer program to achieve an improved traffic awareness in drivers of vehicles which form part of vehicle platoons.

Another objective of the invention is to provide a method, a device and a computer program to achieve improved road safety.

Another objective of the invention is to provide an alternative method, an alternative device and an alternative computer program for vehicle platoons comprising at least one leader vehicle.

These objectives are achieved with a method according to the disclosure herein.

According to one aspect of the invention, a method is provided for vehicle platoons comprising at least one leader vehicle and at least one additional vehicle, wherein the leader vehicle is intended to detect ambient conditions. The method comprises the steps of:

appointing said leader vehicle as responsible for communicating information to at least one additional vehicle; and under certain conditions, appoint a new leader vehicle and thus let said new leader vehicle assume said responsibility.

Herein, a dynamic method in vehicle platoons is provided, where a suitable leader vehicle is responsible for communicating relevant information, e.g. in relation to control of the progress of other vehicles in the vehicle platoon. This is particularly advantageous where a leader vehicle for some reason leaves the vehicle platoon. This is also advantageous where a vehicle, external to the vehicle platoon, joins the vehicle platoon and, in doing this, positions itself first in the vehicle platoon. It is also advantageous to be able to appoint a new leader vehicle with said responsibility if a communications link between the vehicles in the vehicle platoon does not function in the intended manner. It is also advantageous to be able to appoint a previous leader vehicle as responsible again, where said communications link reverts to functioning in the intended manner and contact may be resumed.

Said information may comprise a result of said detection. The method may comprise the step to:

control the progress of said one additional vehicle based on said information. Said control may be automatic or semi-automatic.

Said conditions may comprise changes in the vehicle platoon relating to vehicles joining and leaving. Herein, a flexible and user-friendly method for vehicle platoons is provided.

Said conditions may comprise deficiencies arising in said leader vehicle's ability to communicate said information to said at least one additional vehicle.

Said conditions may comprise obvious deficiencies arising in the information.

The method may comprise the step to:

appoint said new leader vehicle at the initiative of an already appointed leader vehicle, or at the initiative of said at least one additional vehicle. Said appointment of said new leader vehicle may occur automatically. Said appointment may occur at the initiative of a driver of the leader vehicle, or at the initiative of a driver in a vehicle in the vehicle platoon, or at the initiative of a driver of a vehicle joining the vehicle platoon. Herein, a flexible and user-friendly method for vehicle platoons is provided.

The method may comprise the step to:

under certain conditions, distribute said responsibility to more than one vehicle, where said distribution comprises successive transfer of said responsibility.

Herein, said responsibility may be distributed successively in a suitable manner. Herein, a leader vehicle and a leader vehicle taking over may, for a certain period of time, share the responsibility to determine said ambient conditions and the driving characteristics for control of the progress of vehicles forming part of the vehicle platoon. For example, the responsibility for determining ambient conditions with different sensor elements may be distributed successively.

Said leader vehicle may be driven first in said vehicle platoon.

Thus, an improved driving experience for a driver of a vehicle behind is achieved. The method also entails that a driver achieves an increased understanding of the prevailing traffic situation, and an increased understanding of why automated systems of the vehicle act in a certain manner.

According to one example, route information may be communicated up to 1 km, so that drivers in subsequent vehicles may connect to the wireless communication before the vehicle reaches a vehicle ahead, where forward visibility is limited. Further, a number of subsequent vehicles may thus form part of a vehicle platoon and still obtain route information from a vehicle which is first in said vehicle platoon. Thus, a first vehicle in the vehicle platoon may communicate directly with a number of subsequent vehicles, so that unnecessary delays in the transfer of route information are avoided.

The method is connected with short delays as regards transferred information. The method is also easy and cheap to install in vehicles. According to one embodiment, information regarding a prevailing position of vehicles ahead is also transferred to one or several subsequent vehicles. This may take place at the same time as said route information is transferred from a vehicle ahead to a subsequent vehicle. Said position information may be transmitted continuously or intermittently. Said position information may be determined with a GPS device.

According to one embodiment, information about how a vehicle ahead wishes to regulate its speed is transmitted to one or several subsequent vehicles. This may take place at the same time as said route information is transferred from a vehicle ahead to a subsequent vehicle. Said speed information may be transferred continuously or intermittently. Thus, a control system of a subsequent vehicle may obtain information about how a vehicle ahead will behave in the future, as regards e.g. retardation or acceleration.

One advantage of the present invention is that said route information may comprise information regarding existing road signs, moving animals and other fixed or moveable objects, the road, the area in front of the vehicle ahead, areas outside the road, road works, pedestrians, cyclists or potential lane changes made by the vehicles ahead. Thus, a driver in a vehicle behind may obtain an increased understanding of a prevailing or future traffic situation.

The collision risk for vehicles forming part of said vehicle platoon may thus be eliminated, minimised or reduced.

Simply put, sensor elements of said leader vehicle may be used advantageously to determine a basis for the control of at least one additional vehicle behind.

According to one aspect of the present invention, said leader vehicle may be driven by manual control, i.e. a driver of the vehicle controls, with different means, the vehicle's speed and direction of travel. Subsequent vehicles forming part of the vehicle platoon may be driven automatically, i.e. with an activated so-called autopilot or with driving routines for automatic driving. Said driving routines may e.g. comprise an automatic cruise control function and/or an automatic function for direction of travel. According to the invention, said subsequent vehicles in the vehicle platoon may thus be controlled automatically, based on how the leader vehicle is driven and/or based on phenomena detected through said leader vehicle.

According to one aspect of the invention, said subsequent vehicles in the vehicle platoon may be controlled automatically, based on how the leader vehicle is intended to be driven.

According to one aspect of the present invention, a distance between said leader vehicle and a subsequent vehicle may be greater than the distance between said subsequent vehicle and an additional subsequent vehicle. Thus safe driving of vehicle platoons is advantageously achieved.

Herein, sensor elements to detect ambient conditions and elements to determine driving characteristics of said leader vehicle may be used effectively to control the progress of said at least one additional vehicle. Said at least one additional vehicle is a vehicle which is subsequent to said leader vehicle.

The method may comprise the step to communicate said ambient conditions and/or said driving characteristics, from the leader vehicle to said at least one additional vehicle. Said ambient conditions and/or said driving characteristics may be communicated from the leader vehicle in the form of raw data, said leader vehicle only relaying said information to said at least one additional vehicle.

According to one example embodiment, the method comprises the step to determine, in the leader vehicle and based on said ambient conditions and/or said driving characteristics, a warning and to communicate said warning to said at least one additional vehicle. Said warning may comprise suitable information.

The method may comprise the step to determine a suitable progress of said at least one additional vehicle, based on said ambient conditions and/or said driving characteristics of said leader vehicle, through elements provided in said leader vehicle.

The method may comprise the step to determine a suitable progress of said at least one additional vehicle, based on said ambient conditions and/or said driving characteristics of said leader vehicle, through elements provided in said additional vehicle.

The method may comprise the step to determine a suitable progress of said at least one additional vehicle, based on said ambient conditions and/or said driving characteristics of said leader vehicle, through elements provided externally to said vehicle platoon, e.g. elements arranged along a travel path for said vehicle platoon or elements in a so-called fleet management centre.

The method may comprise the step to:

automatically control the progress of said at least one additional vehicle. Thus a risk of e.g. collision between vehicles within said vehicle platoon may be minimised.

A user-friendly, robust and cost-effective method for the control of vehicle platoons for increased safety is thus achieved.

The method may comprise the step to:

determine instructions for an operator, relating to a suitable progress of said at least one additional vehicle, based on said ambient conditions and/or said driving characteristics of said leader vehicle. This may occur in said leader vehicle and/or in said at least one additional vehicle.

The method may comprise the step to:

manually control the progress of said at least one additional vehicle, based on said instructions for an operator, communicated to said at least one additional vehicle from said leader vehicle. A user-friendly, robust and cost-effective method for the control of vehicle platoons for increased safety is thus achieved.

The method may comprise the step to:

manually control the progress of said at least one additional vehicle, based on said instructions for an operator, determined in said at least one additional vehicle. A user-friendly, robust and cost-effective method for the control of vehicle platoons for increased safety is thus achieved.

The method may comprise the step to:

determine said instructions based on said ambient conditions and/or said driving characteristics. Said determination may take place in real time, continuously or intermittently. Thus a reliable method for safe driving in a vehicle platoon is obtained. Thus a user-friendly method for safe driving in a vehicle platoon is obtained. A method for safe driving in a vehicle platoon is thus provided, where the response time of a driver of said at least one additional vehicle may be minimised.

Said ambient conditions may comprise at least one of the parameters of traffic situation including risk elements, road characteristics, climate characteristics and road signs. Thus a versatile method is obtained, where different parameters may be considered as a basis for controlling the driving of said at least one additional vehicle.

Said driving characteristics comprise at least one of the parameters of speed, speed changes, direction of travel and intended changes in direction of travel. Said driving characteristics may comprise at least one of the parameters of future intended speed and future intended speed changes. Thus, said at least one additional vehicle may be controlled based on information about how said leader vehicle is driven and/or will be driven within a certain time period. In this manner, an essentially maintained vehicle platoon configuration may be maintained when the progress of said leader vehicle changes.

By controlling said at least one additional vehicle based on existing accelerations, retardations and turns of said leader vehicle, a desirable maintenance of the vehicle platoon's configuration may be achieved.

By controlling said at least one additional vehicle based on future accelerations, retardations and turns of said leader vehicle, a desirable maintenance of the vehicle platoon's configuration may be achieved.

A driver or operator of said at least one additional vehicle may feel safe when automatic manoeuvres are carried out in the vehicle. This may involve automatic braking or automatic gear selection in a transmission of the vehicle behind.

According to one aspect of the present invention, an improved driving experience for a driver of a subsequent vehicle may be achieved. This is the case e.g. where the ambient characteristics detected by a leader vehicle are communicated to a subsequent vehicle for presentation. For example, this may occur by showing pictures of the surrounding environment in real time from a video camera in said leader vehicle. The method may thus entail that a driver achieves an increased understanding of the prevailing traffic situation and an increased understanding of why automated systems of vehicles act in a certain manner.

According to one example, route information may be communicated up to 1 km, so that drivers in subsequent vehicles may connect to the wireless communication before the vehicle reaches a vehicle ahead, where forward visibility is limited. Further, a number of subsequent vehicles may thus form part of a vehicle platoon and still obtain route information from a vehicle which is first in said vehicle platoon. Thus, a first vehicle in the vehicle platoon may communicate directly with a number of subsequent vehicles, so that unnecessary delays in the transfer of route information are avoided.

The method is connected with short delays as regards transferred information. The method is also easy and cheap to install in vehicles. According to one embodiment, information regarding a prevailing position of vehicles ahead is also transferred to one or several subsequent vehicles. This may take place at the same time as said route information is transferred from a vehicle ahead to a subsequent vehicle. Said position information may be transmitted continuously or intermittently. Said position information may be determined with a GPS device.

According to one embodiment, information about how a vehicle ahead wishes to regulate its speed is transmitted to one or several subsequent vehicles. This may occur at the same time as said detected and/or determined information is transmitted from a leader vehicle in front to at least one subsequent vehicle. Said information may be transmitted continuously or intermittently. Thus, a control system of a subsequent vehicle may obtain information about how a vehicle ahead will behave in the future, as regards e.g. retardation or acceleration. Said information may be used to automatically control the progress of said at least one additional vehicle.

One advantage of the present invention is that transmitted road information may comprise information regarding existing road signs, moving animals and other fixed or moveable objects, the road, the area in front of the vehicle ahead, areas outside the road, road works, pedestrians, cyclists or potential lane changes made by the vehicles ahead. When said route information is displayed, a driver in a subsequent vehicle may achieve an increased understanding of a prevailing or future traffic situation. Further, said driver may achieve an increased understanding of automatic control of the progress of the vehicle handled by him.

The method is advantageous where an existing vehicle platoon needs to be divided into at least two new vehicle platoons. Said vehicle platoon may need to be divided where vehicles in the vehicle platoon have to drive different routes, where the vehicle platoon is too long, the vehicle platoon comprises too many vehicles, or a vehicle which does not form part of the vehicle platoon infiltrates the vehicle platoon.

A new leader vehicle may be appointed, when another vehicle in the vehicle platoon is better suited than an existing leader vehicle, e.g. where this vehicle comprises better sensors or better calculation capacity. The vehicle may be better suited if it is lighter or carries a lighter load or a safer load. The vehicle may be better suited if it is more visible to the Surrounding traffic. The vehicle may be better suited for purposes of leading the vehicle platoon if it has less air resistance or better aerodynamic characteristics.

The method is easy to implement in existing motor vehicles. Software for vehicle platoons may be installed in a control device of the vehicle when manufactured. A purchaser of the vehicle may thus be afforded the opportunity to select the performance function as an extra option.

Alternatively, software comprising program code to perform the innovative method may be installed in a control device of the vehicle when upgraded at a service station. In this case, the software may be uploaded to a memory in the control device. Implementation of the innovative method is also cost-effective.

Software comprising program code to transfer responsibility to a new leader vehicle may be easily updated or replaced. In addition, different parts of the software comprising program code for platoons may be replaced independently of each other. This modular configuration is advantageous from a maintenance perspective.

According to one aspect of the present invention, a device is provided in vehicle platoons, comprising at least one leader vehicle and at least one additional vehicle, the device comprising elements adapted to detect ambient conditions. The device includes:
  elements adapted to appoint said leader vehicle as responsible for communicating information to said at least one additional vehicle; and
  elements adapted to, under certain conditions, appoint a new leader vehicle and thus let said new leader vehicle assume said responsibility.
The device may comprise:
  elements adapted to determine a result based on said detection;
  elements adapted to determine said information based on said result of said detection.
The device may comprise:
  elements adapted to control the progress of said one additional vehicle, based on said information.

In the device, said conditions may comprise changes in the vehicle platoon relating to joining vehicles and leaving vehicles.

In the device, said conditions may comprise arising deficiencies in said leader vehicle's possibilities of communicating said information to said at least one additional vehicle.

In the device, said conditions may comprise obvious deficiencies arising in said information.

The device may comprise:
  elements adapted to appoint said new leader vehicle, following the initiative of an already appointed leader vehicle; and/or
  elements adapted to appoint said new leader vehicle, following the initiative of said at least one additional vehicle;
The device may comprise:
  elements adapted, under certain conditions, to distribute said responsibility over more than one vehicle.

Said conditions may e.g. be where a vehicle connects to a vehicle platoon and places itself in front of said leader vehicle.

The device may comprise:
  elements adapted to distribute responsibility through successive transfer of said responsibility.

The device may comprise elements adapted to determine a suitable progress of at least one vehicle in the vehicle platoon, based on said ambient conditions and/or said driving characteristics of said leader vehicle. Said elements may be provided in said leader vehicle.

The device may comprise elements adapted to determine a suitable progress of at least one vehicle in the vehicle platoon, based on said ambient conditions and/or said driving characteristics of said leader vehicle. Said elements may be provided in said additional vehicles.

The device may comprise elements adapted to determine a suitable progress of said at least one additional vehicle in the vehicle platoon, based on said ambient conditions and/or said driving characteristic of said leader vehicle. Said elements may be provided externally in said vehicle platoon. These elements may e.g. be arranged along a route for said vehicle platoon or in a so-called fleet management centre.

The device may comprise:
  elements adapted to control the progress of said at least one additional vehicle in the vehicle platoon automatically.
The device may comprise:
  elements adapted to present instructions to an operator, communicated from said leader vehicle for manual control of the progress of said at least one additional vehicle in the vehicle platoon. Said presentation element may comprise a display screen. Said presentation element may comprise speakers to present said instructions in the form of audio signals or synthesized speech.
The device may comprise:
  elements adapted to determine said instructions based on said ambient conditions and/or said driving characteristics.

In the device, said ambient conditions may comprise at least one of the parameters of traffic situation including risk elements, road characteristics, climate characteristics and road signs.

In the device, said driving characteristics may comprise at least one of the parameters of speed, speed changes, direction of travel and intended changes in direction of travel.

According to one aspect of the invention, a simple retrofitting of said device may be carried out. Existing vehicles may thus be upgraded quickly and relatively cheaply. The required software may easily be installed in a control device of the vehicle and/or a portable computer which may be connected to a network in the vehicle.

The above objectives are achieved also with a motor vehicle comprising the innovative device in a vehicle platoon. The motor vehicle may be a truck, a bus or a car.

According to one aspect of the invention, a computer program is provided in a vehicle platoon, wherein said computer program comprises program code stored in a computer-readable medium, in order to cause an electronic control device or another computer, connected to the electronic control device, to perform the steps according to the disclosure herein.

According to one aspect of the invention, a computer program is provided in a vehicle platoon, wherein said computer program comprises program code to cause an electronic control device or another computer, connected to the electronic control device, to perform the steps according to the disclosure herein.

According to one aspect of the invention, a computer program product comprising program code stored in a computer-readable medium is provided to perform the method steps disclosed herein, when said program code is executed in an electronic control device or in another computer connected to the electronic control device.

Additional objectives, advantages and novel features of the present invention will be apparent to one skilled in the art from the following details, and through exercising the invention. While the invention is described below, it should be apparent that the invention is not limited to the specific details described. One skilled in the art, having access to the teachings herein, will recognise additional applications, modifications and incorporations in other areas, which are within the scope of the invention.

GENERAL DESCRIPTION OF THE DRAWINGS

Figure 2:
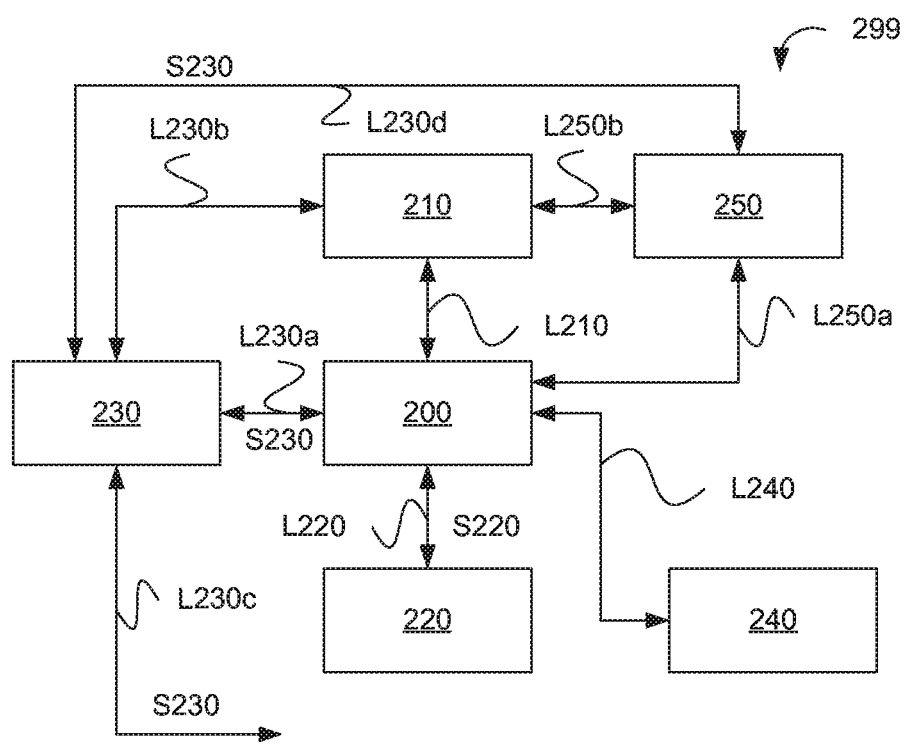
Figure 3A:
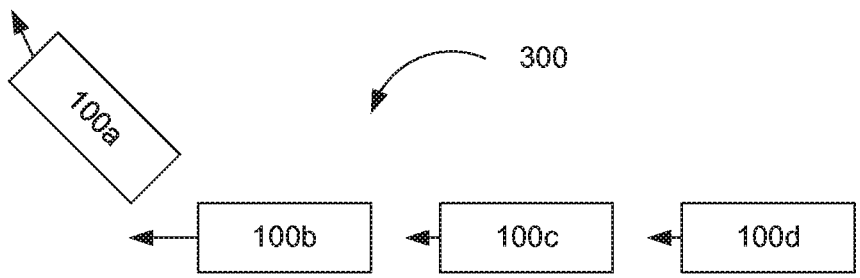
Figure 3B:
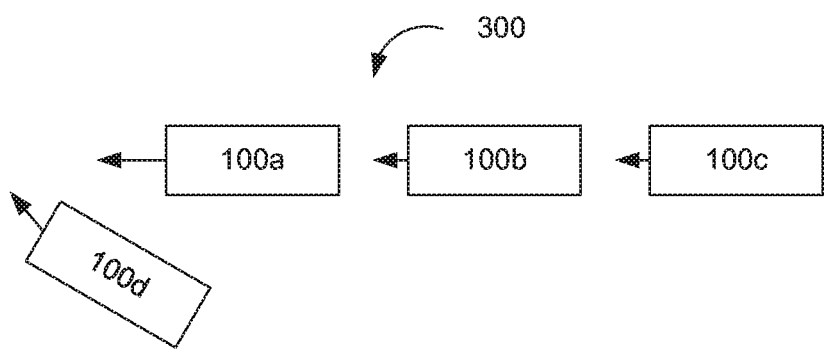
Figure 3C:
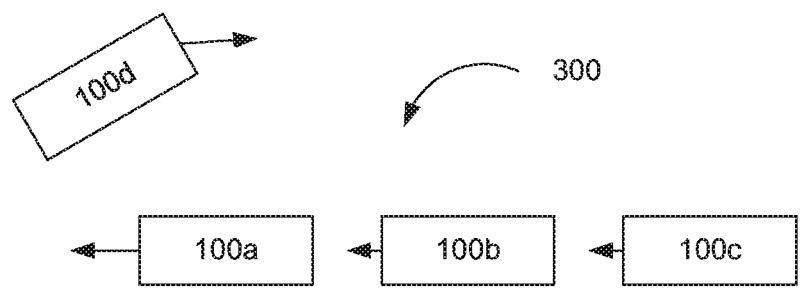
Figure 5:
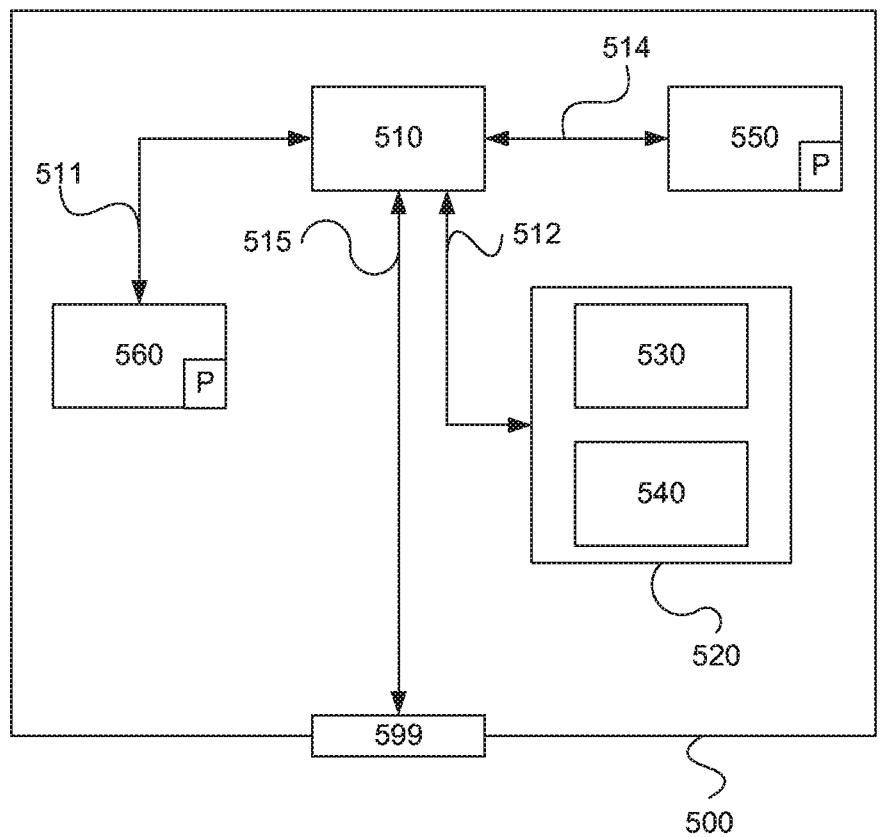

For a more complete understanding of the present invention and the additional objects and advantages thereof, reference is now made to the following detailed description, which is to be read together with the accompanying drawings, in which the same reference designations pertain to identical parts in the various figures, and in which:

FIG. 1 schematically illustrates a vehicle, according to one embodiment of the invention;

FIG. 2 schematically illustrates a device in the vehicle shown in FIG. 1, according to one embodiment of the invention;

FIG. 3a schematically illustrates a vehicle platoon;

FIG. 3b schematically illustrates a vehicle platoon;

FIG. 3c schematically illustrates a vehicle platoon;

FIG. 4a schematically illustrates a flow chart of a method, according to one embodiment of the invention;

FIG. 4b schematically illustrates in more detail a flow chart of a method, according to one embodiment of the invention;

FIG. 5 schematically illustrates a computer, according to one embodiment of the invention.

DETAILED DESCRIPTION OF THE FIGURES

A side view of a vehicle 100 is shown with reference to FIG. 1. The exemplary vehicle 100 consists of a tractor 110 and a trailer 112. Alternatively the vehicle 100 may be a truck or a tractor without a trailer or semi-trailer. The vehicle may be a truck with more than one trailer. The vehicle may be a heavy goods vehicle, such as a truck or a bus. Alternatively, the vehicle may be a car.

The term "link" herein refers to a communications link, which may be a physical line, such as an optoelectronic communication line or a non-physical line such as a wireless connection, e.g. a radio or microwave link.

The term "vehicle platoon" as used herein refers to a number of vehicles, e.g. trucks, driven one after the other with a distance between them, which falls below a predetermined value, e.g. 75 meters, 50 meters, 25 meters or 10 meters. The said distance may be a distance where a reduced reduction of air resistance of a vehicle behind may be obtained. This distance depends, among other things, on the size and shape of the vehicle. A vehicle which is first in said vehicle platoon is called a "leader vehicle" herein. A vehicle platoon may comprise a suitable number of vehicles, e.g. 2, 3, 5 or 10 vehicles. A vehicle platoon may comprise more than 10 vehicles.

With reference to FIG. 2, a device 299 in the vehicle 100 is shown. The device 299 may be arranged in the tractor 110.

The vehicles forming part of a vehicle platoon may all be equipped with the device 299. A random vehicle may thus be the vehicle that is driven first in the vehicle platoon (leader vehicle) or a vehicle behind or a joining vehicle, i.e. a vehicle that is driven directly following the leader vehicle or further back in the line, or a vehicle that joins said vehicle platoon.

The device 299 comprises a control device 200. The control device 200 comprises electronics and software, which is described in further detail with reference to FIG. 5.

A control device 200 in a leader vehicle is arranged to detect the ambient conditions via suitable elements, and to determine driving characteristics of said leader vehicle.

The control device 200 is arranged to transfer said detected ambient conditions and to determine the driving characteristics via a wireless communications network common to at least two vehicles, e.g. said leader vehicle and a vehicle behind. The control device 200 of a subsequent vehicle may be arranged to forward said transferred information to an additional subsequent vehicle in the vehicle platoon. The control device 200 is adapted to determine a suitable progress of said at least one additional vehicle, based on said ambient conditions and/or said driving characteristics of said leader vehicle. The control device 200 is adapted to automatically control the progress of said at least one vehicle 100.

A computer device 210 is arranged for communication with the first control unit 200 via a link L210. The computer device 210 may be detachably connected to the first control device 200. The computer device 210 may be arranged to be supplied with power via an existing battery in the vehicle, e.g. a 24V battery, which is often installed in heavy goods vehicles today. The computer device 210 may be a control device external to the vehicle 100. The computer device 210 may be a conventional portable computer. The computer device 210 may be arranged to carry out method steps according to the invention. The computer device 210 may be used to transfer software to the control device 200, in particular software to perform the innovative method. The computer device 210 may alternatively be arranged for communication with the first control device 200 via an internal network in the vehicle. The computer device 210 may be arranged to carry out substantially similar functions as the first control device 200, e.g. appointing said leader vehicle as responsible for communicating information to said at least one additional vehicle; and under certain conditions, to appoint a new leader vehicle and thus to let said new leader vehicle assume said responsibility.

A GPS device 220 is arranged for communication with the control device 200 via a link L220. The GPS device 220 is arranged to continuously determine a prevailing position for the vehicle 100. The GPS device 220 is arranged to continuously determine a prevailing speed for the vehicle 100. The GPS device 220 is arranged to continuously send signals S220, comprising information regarding a prevailing position for the vehicle 100, to the control device 200 via the link L220. Said GPS device may form part of a GNSS (Global Navigation Satellite System). Systems other than GPS may be used, e.g. GLONASS.

The control device 200 is arranged to continuously, via suitable elements, determine information comprising details about the prevailing position, speed, speed changes, direction of travel and/or changes in direction of travel of the vehicle. The control device 200 is arranged to continuously, via suitable elements, determine information comprising details about the prevailing intended speed, intended speed changes, intended direction of travel and/or intended changes in direction of travel of the vehicle. Said information is also called driving characteristics.

Said driving characteristics may be communicated automatically from a leader vehicle to a subsequent vehicle. Thus, a control system of a subsequent vehicle may obtain said information and automatically control e.g. engine, transmission and/or brake systems based on said information.

The control device 200 is arranged to continuously, via suitable elements, determine information comprising data about ambient conditions. Said ambient conditions may comprise at least one of the parameters traffic situation including risk elements, road characteristics, climate characteristics and road signs.

Said ambient conditions may be communicated automatically from a leader vehicle to a vehicle behind. Thus, a control system of a vehicle behind may obtain said information and automatically control e.g. engine, transmission and/or brake systems based on said information.

Said driving characteristics and said ambient conditions may be communicated from a leader vehicle to a subsequent vehicle in the vehicle platoon essentially simultaneously.

Said driving characteristics may be communicated automatically from a vehicle in the vehicle platoon to a leader vehicle for suitable use.

Said ambient characteristics may be communicated automatically from a vehicle in the vehicle platoon to a leader vehicle for suitable use.

Said driving characteristics and said ambient conditions may be communicated from a vehicle in the vehicle platoon to the leader vehicle essentially simultaneously.

Said leader vehicle may be arranged to communicate directly with more than one vehicle in the vehicle platoon. Said leader vehicle may be arranged to communicate directly with more than one vehicle in the vehicle platoon at the same time A sensor configuration 230 is arranged for communication with the control device 200, via a link L230a. The sensor configuration 230 is arranged to continuously detect ambient conditions. The sensor configuration 230 is arranged to continuously determine the driving characteristics of the vehicle.

The sensor configuration 230 is arranged to continuously generate signals S230 comprising said ambient conditions and/or driving characteristics. The sensor configuration 230 is arranged to continuously send a signal S230 comprising said information to the control device 200 via the link L230a. The control device 200 is, according to one example, arranged to send said signal S230 to at least one subsequent vehicle via the communications element 250.

According to one embodiment, the sensor configuration 230 is arranged to continuously send a signal S230 comprising said information to the communications element 250 via a link L230d. The communications element 250 is arranged to forward said signal S230 to at least one subsequent vehicle in the vehicle platoon.

According to one embodiment, the sensor configuration 230 is arranged to continuously send a signal S230 comprising said information directly to a subsequent vehicle via a link L230c.

According to one alternative embodiment, said sensor configuration 230 is arranged to send signals S230, comprising said information, from a leader vehicle in real time to the computer 210 via a link L230b. Said sensor configuration 230 is arranged to transfer said information in real time directly to said computer 210 via the link L230b. Thus, according to this embodiment, no signals S230 comprising said information are sent directly to the control device 200 to be forwarded to at least one subsequent vehicle. Thus, according to this embodiment, no signals S230 comprising said route information are sent directly to said at least one subsequent vehicle.

According to this embodiment, the computer 210 is arranged to forward said signals S230 to the communications elements 250 via a link L250b. Alternatively the computer 210 is arranged to forward said signals S230 to the communications element 250 via the control device 200, i.e. via the link L210 and a link L250a.

According to an alternative embodiment, said sensor configuration 230 is arranged to transfer said information in real time from a leader vehicle to a subsequent vehicle. Herein, said sensor configuration 230 is arranged to transfer said information in real time to a subsequent vehicle, and/or at least one additional subsequent vehicle. Thus, according to this embodiment no signals S230 comprising said route information are sent to the control device 200 or to said computer 210 to be forwarded to at least one subsequent vehicle.

The control device 200 is adapted to determine said instructions based on said ambient conditions and/or said driving characteristics. Said instructions may thus be determined in said leader vehicle or in a vehicle behind in the vehicle platoon.

The control device 200 is adapted to determine a suitable progress in a vehicle, which is driven after the leader vehicle in the vehicle platoon, based on said ambient conditions and/or said driving characteristics of said leader vehicle. The control device 200 is arranged to communicate, in a suitable manner, information about said determined suitable progress to at least one subsequent vehicle in the vehicle platoon. The subsequent vehicles may herein be controlled automatically based on said determined suitable progress. Said suitable progress may comprise speed, speed changes, direction of travel and/or changes in direction of travel.

According to one embodiment, a control device in a vehicle which is driven behind said leader vehicle in the vehicle platoon is adapted to determine a suitable progress in the vehicle, based on information about said ambient conditions and/or said driving characteristics. Herein, said subsequent vehicles may be controlled automatically based on said determined suitable progress.

Said sensor configuration 230 may comprise suitable sensors. Said sensor configuration 230 may comprise a suitable number of sensors. Said sensor configuration 230 may comprise a suitable number of different sensors. Said sensor configuration may comprise a camera. Said sensor configuration 230 may be a video camera. Said sensor configuration 230 may be a web camera.

According to one embodiment, said sensor configuration 230 comprises a number of cameras, e.g. video cameras. Said several cameras may be set so that they continuously record different fields of vision in order to detect ambient conditions, which ambient conditions may be transmitted to at least one subsequent vehicle. Said fields of vision may at least partly overlap.

According to one embodiment, said sensor configuration 230 comprises a radar device to determine the occurrence of external objects and the distance connected therewith, and/or distance changes relating to the vehicle and said object. The radar device may be arranged to continuously determine a distance to a vehicle ahead. Herein a distance to a vehicle ahead may be automatically set, a control system of the vehicle may automatically controlling the operation of the vehicle, so that a desired distance to a vehicle ahead is maintained.

According to one embodiment, said sensor configuration 230 comprises an ultrasound device to determine the occurrence of external objects and distances connected therewith, and/or distance changes relating to the vehicle and said object. The ultrasound device may be arranged to continuously determine a distance to a vehicle ahead.

According to one embodiment, said sensor configuration 230 comprises a laser light device in order to determine the occurrence of external objects and distances connected therewith, and/or distance change relating to the vehicle and said object. The laser light device may be arranged to continuously determine a distance to a vehicle ahead.

According to one embodiment, said sensor configuration 230 comprises an IR-camera to determine the occurrence of external objects and distances connected therewith, and/or changes in distances relating to the vehicle and said object. The IR-camera may be arranged to continuously determine a distance to a vehicle ahead.

The control device 200 comprises an analysis program to determine said ambient conditions, based on information detected by said sensor configuration. Said analysis program may be an image processing program.

Said sensor configuration 230 may comprise suitable sensors to determine the driving characteristics. Examples of such sensors may be a steering wheel angle sensor, throttle sensor, brake pedal sensor, speed sensor, etc.

The control device may, based on data detected by said sensor configuration 230, determine said ambient conditions and said driving characteristics.

Presentation devices 240 are arranged for communication with the control device 200 via a link L240. Said presentation elements 240 may comprise a display screen. The presentation elements 240 are arranged to continuously receive transmitted signals S230 comprising route information, e.g. in the form of a video stream. The presentation elements 240 may be arranged to show said received video stream in real time in said subsequent vehicle, so that at least one field of vision available in said vehicle in front is continuously made available in said subsequent vehicle.

According to one embodiment, the presentation elements 240 may be arranged to show several video recordings simultaneously, in different windows of the display screen. A driver in a subsequent vehicle may thus via suitable elements select which video streams the driver wishes to be shown. The size of the windows for the respective received video streams, from the respective fields of vision of said vehicles ahead, may be set in a suitable manner.

According to the invention, a display device 240 is provided, e.g. placed on a dashboard in the cabin of the vehicle. The presentation elements 240 are arranged to show a stream of pictures, so that at least one field of vision available in the vehicle 100 ahead is made available continuously in the subsequent vehicle where the driver is located.

Said presentation element 240 may comprise a detachably connected display screen. The screen may be a touch screen. Said presentation elements 240 may constitute an integrated component in the vehicle's dashboard or control section.

According to one example, where the subsequent vehicle is driven with automatic speed adjustment, the driver may thus better understand why control systems in the vehicle automatically change a prevailing speed and/or direction of travel in the vehicle.

Said presentation elements 240 may comprise speakers to present instructions regarding the vehicle's progress in the form of audio signals or synthesized speech. Said instructions may be determined in a leader vehicle or in a subsequent vehicle in the vehicle platoon. Said instructions may be determined based on said ambient characteristics and/or said driving characteristics.

Below is a number of examples of control of a subsequent vehicle, in relation to the leader vehicle, in a vehicle platoon.

Example 1

In the event said leader vehicle, through the sensor configuration 230, determines the ambient conditions, comprising a traffic situation where an obstacle on the road ahead exists, said leader vehicle may change lanes, for example. Thus, the subsequent vehicle may be automatically controlled so that it also changes lanes in the same manner, in order for the vehicle platoon's configuration to remain substantially unchanged following said lane change.

Said traffic situation may entail a certain elements of risk, e.g. where road works are determined to be ongoing, road workers moving around on site. Thus, the subsequent vehicle may be automatically controlled so that its speed is reduced to a suitable speed.

Example 2

In the event said leader vehicle, through a sensor configuration 230, determines ambient conditions comprising road characteristics comprising information about slippery surfaces, the subsequent vehicle may be automatically controlled in such a manner that its speed is reduced to a suitable speed.

Example 3

In the event said leader vehicle, through a sensor configuration 230, determines ambient conditions comprising climate characteristics in the form of an ambient temperature below a predetermined temperature level, or in the form of prevailing precipitation of a certain type, or wind speeds exceeding a certain magnitude, the subsequent vehicle may be automatically controlled so that its speed is a suitable speed under the given conditions.

Example 4

In the event said leader vehicle, through a sensor configuration 230, determines ambient conditions comprising road signs or other traffic information, the subsequent vehicle may be automatically controlled in such a manner that its speed is reduced to a suitable speed under the given conditions.

Below is a number of examples of spoken and/or displayed instructions/messages/warnings which may be presented according to different aspects of the invention.

Example 5

An instruction for presentation to a driver in a vehicle which is driven behind a leader vehicle in a vehicle platoon may be: "Reduce speed to 50 km/h and continue in current lane".

Example 6

An instruction for presentation to a driver in a vehicle which is driven behind a leader vehicle in a vehicle platoon may be: "There are road works 100 meters in front of the vehicle, change lanes to the right and reduce speed to 30 km/h".

Example 7

A message for presentation to a driver in a vehicle that is driven behind a leader vehicle in a vehicle platoon may be:

"The leader vehicle may temporarily slow down but then revert to the original speed. No measure needs to be taken by you".

Example 8

A message for presentation to a driver in a vehicle that is driven behind a leader vehicle in a vehicle platoon may be: "Wild animals on the road ahead. Stop the vehicle immediately".

End of examples.

Said communications elements 250 are arranged for communication with the control device 200 via a link L250*a*. Said communications elements 250 are arranged to receive the signal S230, comprising said information about ambient conditions and/or driving characteristics. Said communications elements 250 are arranged to send said signal S230 to at least one subsequent vehicle. The communications elements 250 may, according to one example, be arranged for wireless communication and thus send said information using the standard 802.11 ABGN. The communications elements 250 may, according to one example, be arranged for wireless communication according to 802.11 P.

FIG. 3*a* schematically illustrates a vehicle platoon 300. Said vehicle platoon comprises four vehicles, such as trucks. These vehicles are given the reference numerals 100*a*, 100*b*, 100*c* and 100*d*, respectively.

Thus the vehicle 100*a* is a leader vehicle of said vehicle platoon 300. Said leader vehicle 100*a* has been allocated the responsibility of determining ambient conditions and/or driving characteristics. Said leader vehicle 100*a* is responsible for transmitting said determined ambient conditions and/or driving characteristics to the vehicles 100*b*, 100*c* and 100*d*. Thus, said ambient conditions and/or driving characteristics may be used as a basis for automatic control of the progress of said vehicles 100*b*, 100*c* and 100*d* in a suitable manner.

According to this example, said leader vehicle 100*a* diverts from the vehicle platoon 300, so that said responsibility may be transferred to the vehicle 100*b*, which is then appointed the new leader vehicle.

Said new leader vehicle 100*b* may be appointed at the initiative of the already appointed leader vehicle 100*a* or at the initiative of the vehicle 100*b*.

FIG. 3*b* schematically illustrates a vehicle platoon 300. Said vehicle platoon comprises three vehicles, such as trucks. These vehicles are given the reference numerals 100*a*, 100*b*, 100*c*. An additional vehicle 100*d* is here in the process of joining said vehicle platoon 300.

Here, the vehicle 100*a* is a leader vehicle of said vehicle platoon 300. Said leader vehicle 100*a* has been allocated the responsibility of determining ambient conditions and/or driving characteristics. Said leader vehicle 100*a* is responsible for transmitting said determined ambient conditions and/or driving characteristics to the vehicles 100*b*, 100*c* and 100*d*. Thus, said ambient conditions and/or driving characteristics may be used as a basis for automatic control of the progress of said vehicles 100*b* and 100*c* in a suitable manner.

According to this example, said vehicle 100*d* joins the vehicle platoon 300 by positioning itself ahead of the leader vehicle 100*a*. Thus, said responsibility of the leader vehicle 100*a* may be transferred to the vehicle 100*d*, which is thus appointed the new leader vehicle.

Said new leader vehicle 100*d* may be appointed at the initiative of the already appointed leader vehicle 100*a* or at the initiative of the vehicle 100*d*.

FIG. 3*c* schematically illustrates a vehicle platoon 300. Said vehicle platoon comprises four vehicles, such as trucks. These vehicles are given the reference numerals 100*a*, 100*b*, 100*c* and 100*d*, respectively.

Here, the vehicle 100*a* is a leader vehicle of said vehicle platoon 300. Said leader vehicle 100*a* has been allocated the responsibility of determining ambient conditions and/or driving characteristics. Said leader vehicle 100*a* is responsible for transmitting said determined ambient conditions and/or driving characteristics to the vehicles 100*b*, 100*c* and 100*d*. Thus, said ambient conditions and/or driving characteristics may be used as a basis for automatic control of the progress of said vehicles 100*b* and 100*c* in a suitable manner.

According to this example, shortcomings arising in said leader vehicle's 100*a* ability to communicate said information to the vehicles 100*b*, 100*c* and 100*d* are determined. Said shortcomings may e.g. arise when a communications link is broken between said leader vehicle 100*a* and a subsequent vehicle, e.g. the vehicle 100*b*. This may occur in the case illustrated in FIG. 3*c*, where said leader vehicle 100*a* turns in a curve on a road. Alternatively, this may happen in the event where said leader vehicle for some other reason may not maintain a fully adequate ability to communicate with other vehicles forming part of the vehicle platoon.

According to one example embodiment, said responsibility of the leader vehicle may be transferred to e.g. the vehicle 100*b*, if it is determined that said information comprising ambient conditions and/or driving characteristics show obvious shortcomings. Said determination may take place through a comparison process, where information about the ambient conditions and/or driving characteristics detected in said leader vehicle 100*a* are compared with corresponding ambient conditions and/or driving characteristics detected in at least one of the vehicles 100*b*, 100*c* and 100*d*. If e.g. the leader vehicle communicates that it is driven at 90 km/h, but other vehicles determine that the vehicle platoon is driven at 50 km/h, it may be determined that said information exhibits obvious shortcomings.

Thus, said responsibility of the leader vehicle 100*a* may be transferred to the vehicle 100*b*, which is thus appointed the new leader vehicle.

Said new leader vehicle 100*b* may be appointed at the initiative of the already appointed leader vehicle 100*a* or at the initiative of the vehicle 100*b*.

FIG. 4*a* schematically illustrates a flow chart of a method for vehicle platoons, comprising at least one leader vehicle and at least one additional vehicle, where said leader vehicle is intended to detect ambient conditions, according to one embodiment of the invention. The method comprises an initial method step s401. Step s401 comprises the steps to:

appoint said leader vehicle as responsible for communicating information to said at least one additional vehicle; and under certain conditions, appoint a new leader vehicle and thus let said new leader vehicle assume said responsibility.

The method is completed after step s401.

FIG. 4*b* schematically illustrates a flow chart of a method for vehicle platoons, comprising at least one leader vehicle and at least one additional vehicle, where said leader vehicle is intended to detect ambient conditions, according to one embodiment of the invention.

The method comprises an initial method step s410. The method step s410 comprises the step to appoint said leader vehicle as responsible for communicating information to said at least one additional vehicle. Following the method step s410, a subsequent method step s420 is completed.

The method step s420 comprises the step to determine parameters. Said parameters may comprise ambient conditions and/or driving characteristics in said vehicle platoon. Following the method step s420, a subsequent method step s430 is completed.

The method step s430 comprises the step to communicate information. Said information may comprise the result of said detection. Said result may comprise advice, directions or instructions regarding the progress of the vehicle platoon. The method step s430 may comprise the step to control the progress of at least one vehicle in the vehicle platoon based on said information. Following the method step s430, a subsequent method step s440 is completed.

The method step s440 comprises the step to determine conditions. Said conditions may comprise changes of the vehicle platoon relating to joining vehicles and leaving vehicles. Said conditions may comprise arising shortcomings in said leader vehicle's ability to communicate said information to said at least one additional vehicle in the vehicle platoon. Said conditions may comprise obvious shortcomings arising in said information. Following the method step s440, a subsequent method step s450 is carried out.

The method step s450 comprises the step to, under said determined conditions, appoint a new leader vehicle and thus to allow said new leader vehicle to assume said responsibility. Said new leader vehicle may be appointed at the initiative of the already appointed leader vehicle or at the initiative of the at least one additional vehicle in the vehicle platoon. The method step s450 may comprise the step to, under said determined conditions, distribute said responsibility to more than one vehicle, where said distribution comprises successive transfer of said responsibility. Following the method step s450, the method ends.

With reference to FIG. 5, a diagram of an embodiment of a device 500 is shown. The control devices 200 and 210, which are described with reference to FIG. 2, may in one embodiment comprise the device 500. The device 500 includes a non-volatile memory 520, a data processing unit 510 and a read/write memory 550. The non-volatile memory 520 has a first memory part 530 wherein a computer program, such as an operative system, is stored to control the function of the device 500. Further, the device 500 includes a bus controller, a serial communications port, an I/O device, an A/D converter, a date-time input and transmission unit, an event counter and an interrupt controller (not displayed). The non-volatile memory 520 also has a second memory part 540.

Herein, a computer program P is provided which comprises procedures to detect the ambient conditions of a vehicle, e.g. a leader vehicle. The computer program P comprises procedures to appoint a leader vehicle as responsible for communicating information to at least one additional vehicle. The computer program P comprises procedures to, under certain conditions, appoint a new leader vehicle and thus to let said new leader vehicle assume said responsibility. The computer program P comprises procedures to determine a result of said scan. The computer program P comprises procedures to control the driving of said one additional vehicle based on said information. The computer program P comprises procedures to determine changes in the vehicle platoon with respect to joining vehicles and leaving vehicles, where said conditions comprise said changes. The computer program P comprises procedures to determine arising shortcomings in said leader vehicle's ability to communicate said information to said at least one additional vehicle, where said conditions comprise said determined arising of shortcomings. The computer program P comprises procedures to determine the arising of obvious shortcomings in said information, where said conditions comprise the arising of obvious shortcomings in said information. The computer program P comprises procedures to appoint said new leader vehicle at the initiative of an already appointed leader vehicle or at the initiative of the at least one additional vehicle in the vehicle platoon. The computer program P comprises procedures to, under certain conditions, distribute said responsibility to more than one vehicle, where said distribution comprises successive transfer of said responsibility.

The program P may be stored in an executable manner or in a compressed manner in a memory 560 and/or a read/write memory 550.

A statement that the data processing unit 510 performs a certain function means that the data processing unit 510 performs a certain part of the program, which is stored in the memory 560 or a certain part of the program stored in the read/write memory 550.

The data processing unit 510 may communicate with a data port 599 via a data bus 515. The non-volatile memory 520 is intended for communication with the data processing unit 510 via a data bus 512. The separate memory 560 is intended for communication with the data processing unit 510 via a data bus 511. The read/write memory 550 is arranged for communication with the data processing unit 510 via a data bus 514. For example, the links L210, L220, L230a, L230b, L240, L250a and L250b may be connected to the data port 599 (see FIG. 2).

When data is received in the data port 599 it is temporarily stored in the second memory part 540. When in-data received is temporarily stored, the data processing unit 510 is ready to carry out execution of code in the manner described above. According to one embodiment, the signals received in the data port 599 comprise information regarding ambient conditions and/or driving characteristics of the leader vehicle. According to one embodiment, the signals received in the data port 599 comprise information regarding ambient conditions and/or driving characteristics of the vehicle platoon.

Parts of the methods described herein may be carried out by the device 500 with the help of the data processing unit 510, which runs the program stored in the memory 560 or in the read/write memory 550. When the device 500 runs the program, the procedures described herein are executed.

The foregoing description of the preferred embodiments of the present invention has been furnished for illustrative and descriptive purposes. It is not intended to be exhaustive, or to limit the invention to the variants described. Many modifications and variations will obviously be apparent to one skilled in the art. The embodiments have been chosen and described in order to best explicate the principles of the invention and its practical applications, and to thereby enable one skilled in the art to understand the invention in terms of its various embodiments and with the various modifications that are applicable to its intended use.

The invention claimed is:

1. A method for choosing a leader vehicle in a vehicle platoon, wherein the platoon comprises at least one leader vehicle and at least one additional vehicle, and wherein said leader vehicle is configured to detect ambient conditions pertaining to said leader vehicle and said platoon, the method comprising the steps of:

appointing said leader vehicle with responsibility for detecting ambient conditions, said leader vehicle detecting ambient conditions and communicating information about said detected ambient conditions to said at least one additional vehicle, wherein said information comprises said detected ambient conditions;

controlling driving of said at least one additional vehicle based on the communicated information, wherein said information comprises at least one of route information for a first vehicle of the vehicle platoon and information of how a vehicle ahead in the vehicle platoon controls its speed in relation to one or more vehicles positioned behind in the vehicle platoon, and appointing a new leader vehicle and said new leader vehicle assumes said responsibility in response to changes in the vehicle platoon relating to joining vehicles or leaving vehicles, or in response to defects in the communicated information.

2. A method according to claim 1, further comprising:
appointing said new leader vehicle at an initiative of an already appointed leader vehicle or at an initiative of the at least one additional vehicle.

3. A method according to claim 1, further comprising:
under certain conditions, distributing said responsibility to more than one vehicle, wherein said distributing comprises successive transfers of said responsibility.

4. A method according to claim 1, further comprising driving said leader vehicle first in said vehicle platoon.

5. A method according to claim 1, wherein said information comprises data relating to at least one of: traffic road signs, fixed or moving objects, road, area ahead of the vehicle ahead, off-road area, road constructions, pedestrians, cyclists and lane changes.

6. A computer program product, comprising a non-volatile computer-readable storage medium and program code stored on said medium, wherein said computer program comprises program code for causing an electronic control device or another computer connected to said electronic control device to perform the method according to claim 1, wherein said program code is executed in an electronic control device or in another computer connected to said electronic control device.

7. A system for a vehicle platoon, the platoon comprising at least one leader vehicle and at least one additional vehicle in communication with said at least one leader vehicle, at least said at least one leader vehicle comprising a control device configured to detect ambient conditions and said at least one leader vehicle and said at least one additional vehicle comprising a respective computer device, the system comprising the control device and the computer devices, wherein the computer device of the at least one additional vehicle is configured to control the driving of said at least one additional vehicle based on information relating to said ambient conditions received from said at least one leader vehicle, wherein said information comprises at least one of route information for a first vehicle of the vehicle platoon and information of how a vehicle ahead in the vehicle platoon controls its speed in relation to one or more vehicles positioned behind in the vehicle platoon, and wherein the computer device of said at least one leader vehicle or the at least one additional vehicle is configured to appoint a new leader vehicle and to let said new leader vehicle assume said responsibility in response to changes in the vehicle platoon relating to joining vehicles or leaving vehicles, or in response to defects in the communicated information.

8. A device according to claim 7,
wherein the computer device of said at least one leader vehicle or said at least one additional vehicle is configured to appoint said new leader vehicle following an initiative of said at least one leader vehicle or following an initiative of said at least one additional vehicle.

9. A device according to claim 7, wherein said system is configured, under selected conditions, to distribute said responsibility over more than one vehicle.

10. A device according to claim 9, further comprising:
elements configured to distribute said responsibility through successive transfer of said responsibility.

11. A device according to claim 7, wherein said information comprises data relating to at least one of: traffic road signs, fixed or moving objects, road, area ahead of the vehicle ahead, off-road area, road constructions, pedestrians, cyclists and lane changes.

* * * * *